Jan. 3, 1939.    R. SCHUMANN    2,142,659
WINDSHIELD DEFROSTER
Filed Dec. 24, 1936

INVENTOR
RINEHART SCHUMANN
BY Paul, Paul & Moore
ATTORNEYS

Patented Jan. 3, 1939

2,142,659

UNITED STATES PATENT OFFICE 2,142,659

WINDSHIELD DEFROSTER

Rinehart Schumann, Minneapolis, Minn., assignor to Tropic-Aire, Incorporated, Minneapolis, Minn., a corporation of Delaware Application December 24, 1936, Serial No. 117,427

7 Claims. (Cl. 20—40.5)

This invention relates to new and useful improvements in windshield defrosters, and more particularly to such defrosters of the hot air type.

An object of the present invention is to provide a simple and inexpensive hot air defroster which may readily be attached to a conventional automobile heater without altering the construction thereof.

A further object is to provide a hot air defroster comprising a flexible conduit having an intake nozzle at one end adapted to receive hot air from a heater, and having a nozzle at its opposite end provided with means for securing it in position adjacent to the surface to be defrosted, and means being adjustably secured to the intake nozzle for detachably securing said nozzle to the casing of the heater, and whereby the intake nozzle may be relatively adjusted with respect thereto.

Other objects of the invention reside in the simple and inexpensive construction of the means for detachably securing the receiving end of the conduit to the heater casing; in the provision of a bracket having a tongue adapted to be inserted between the overlapping portions of the heater casing and its front shell, whereby the bracket may readily be clamped to the heater without the necessity of drilling or tapping holes in the casing thereof; and, in the construction of a bracket of the character described, constructed of a single piece of sheet metal having a threaded element mounted therein for securing the bracket to the heater casing.

Other objects of the invention will appear from the following description and accompanying drawing and will be pointed out in the annexed claims.

In the accompanying drawing, there has been disclosed a structure designed to carry out the various objects of the invention, but it is to be understood that the invention is not confined to the exact features shown as various changes may be made within the scope of the claims which follow.

Figure 1:
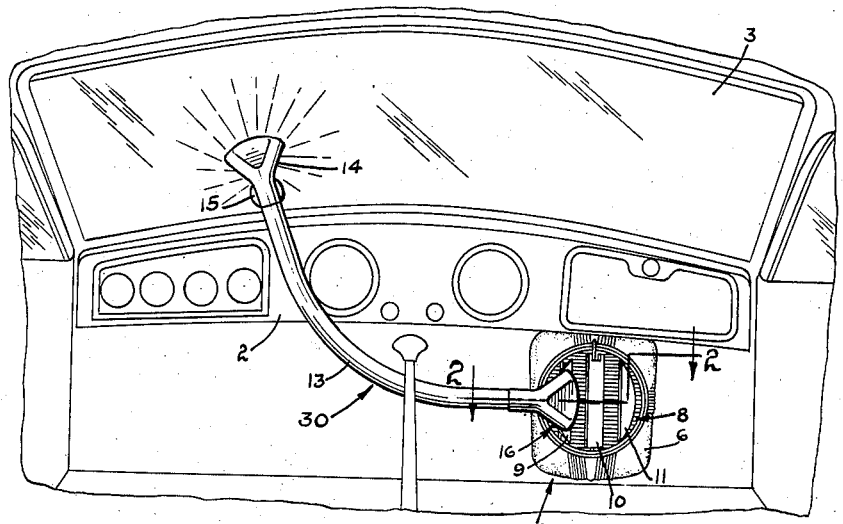
Figure 1 is a view showing the instrument panel and windshield of an automobile with a heater positioned beneath the instrument panel, and illustrating the novel defroster operatively connected to the heater and windshield.
Figure 4:
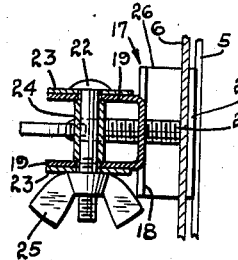
Figure 4 is a detail sectional view on the line 4—4 of Figure 2, showing the means for adjustably securing the intake nozzle to the bracket.

In the selected embodiment of the invention herein disclosed, there is illustrated in Figure 1, a portion of an automotive vehicle comprising the usual instrument panel 2, windshield 3, and hot air heater 4. The heater 4 is shown comprising a casing composed of a main portion 5, open at its front side, and having a front shell 6 fitted over the open side thereof, whereby the front edges of the main casing 5 and rear edges of the front shell 6 are disposed in overlapping relation, as clearly illustrated at 7 in Figure 2. The main casing 5 and front shell 6 are shown secured together by suitable screws 10, having their threaded terminals received in threaded engagement with suitable bosses, shown integral with the front shell 6. In the present instant, the front shell is shown as die cast.

The front shell 6 of the heater is shown provided with the usual hot air opening 8, having suitable deflectors 9, 10 and 11 adjustably mounted therein for controlling the directional flow of air from the heater. It is to be understood that the heater is provided with the usual fan, partially shown at 12 in Figure 2, for circulating air through the heater core, generally indicated by the numeral 20.

The defroster, generally indicated by the numeral 30, is shown comprising a flexible conduit 13, having a discharge nozzle 14 at one end shown provided with suitable means, such as a vacuum cup 15, for securing it in position adjacent to the surface of the windshield, as clearly illustrated in Figure 1. The opposite end of the conduit has an intake nozzle, generally indicated by the numeral 16. This intake nozzle has a flared intake opening adapted to be positioned to receive a portion of the hot air discharging from the heater, as best illustrated in Figure 2.

Figure 3:
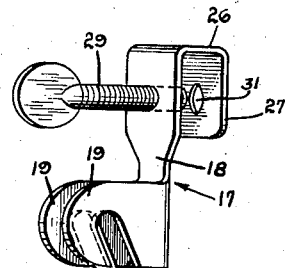
Figure 3 is a perspective view of the bracket detached from the heater and conduit.

An important feature of the present invention resides in the novel means provided for adjustably securing the intake nozzle 16 in position on the heater. The means provided for thus securing the intake nozzle to the heater, is best shown in Figures 2 and 3 and comprises a bracket, generally indicated by the numeral 17. This bracket has a body portion 18, at one end of which a pair of spaced lugs 19 are formed. These lugs are preferably disposed in spaced parallel relation, and each is shown provided with an open slot 21 adapted to receive a clamping screw 22, which also passes through alined apertures provided in a pair of ears 23, formed on the intake nozzle 16. A suitable spacing collar 24 is inserted between the ears 19, whereby the thumb nut 25 of the screw 22 may be tightened to adjustably secure together the lugs 19, ears 23, and collar 24, thereby to support the nozzle 16 in its proper position without danger of bending the ears 19 and lugs 23. Because of the open slots 21, the nozzle 16 may readily be detached from the bracket 17 by simply loosening the thumb nut 25 and sliding the clamping screw 22 out of the slots 21, as will be readily understood by reference to Figure 2.

Figure 2:
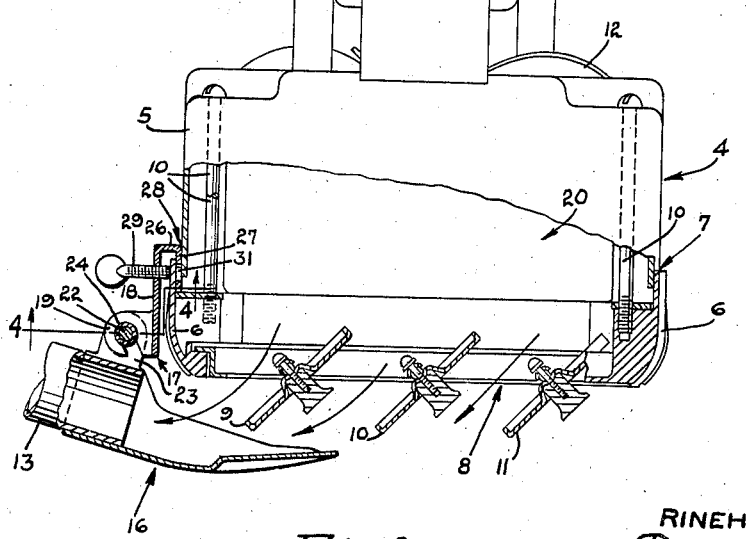
Figure 2 is an enlarged detail sectional view on the line 2—2 of Figure 1, showing the manner of attaching the bracket to the heater casing.

The bracket 17, which preferably is formed of a single piece of sheet metal, is provided at its opposite end with a U-shaped portion 26, whereby a tongue 27 is formed which may be inserted between the overlapping edges of the casing 5 and front shell 6, as illustrated at 28 in Figure 2. A suitable clamping screw 29 is received in threaded engagement with the body portion 18 of the bracket 17, the terminal of which is adapted to engage the edge portion of the front shell 6, as shown in Figure 2, thereby to clampingly secure the bracket to the edge of the front shell, as will be readily understood by reference to Figure 2. A suitable aperture 31 is shown provided in the tongue 27, and is alined with the clamping screw 29.

In some heaters, it may be found impossible to insert the tongue 27 between the main casing 5 and front shell 6, as shown in Figure 2, and a suitable bolt may then be inserted through the threaded opening in which the screw 29 is supported, and the aperture 31, and into a suitable aperture (not shown), provided in the casing 5 of the heater, thereby to secure the bracket to the heater casing. The aperture thus provided in the side of the heater casing may be tapped to receive the screw 29, or it may be drilled, and a suitable nut used on the inside of the casing for receiving the threaded terminal of the screw 29.

By the provision of the novel bracket 17, herein shown, the defroster may readily be attached to a conventional heater without drilling or tapping holes in the heater casing for bolts or screws. The slots 21 in the ears 19 of the bracket provide means whereby, when the defroster is not required, it may readily be detached from the bracket, by simply loosening the thumb nut 25 and sliding the bolt out of the slots 21, whereby the receiving nozzle 16 of the defroster becomes detached from the heater and the defroster may then be removed and stored away for future use. The bracket 17, being small and inconspicuous, may remain attached to the heater casing.

I claim as my invention:

1. A hot air defroster for windshields, comprising a flexible conduit having an intake nozzle at one end adapted to be positioned to receive hot air from a heater, and having means at its opposite end for distributing the hot air over a portion of the windshield, a bracket for adjustably supporting the intake nozzle on the heater, said bracket comprising a body portion having spaced ears thereon, spaced members on the nozzle engageable with said ears, means for securing together said ears and members, whereby the nozzle may be adjusted relatively to the heater, and cooperating members at the opposite end of the bracket between which a portion of the heater casing may be clamped, thereby to secure the bracket to the heater casing.

2. A bracket for securing one end of a flexible conduit to a heater casing, whereby a portion of the hot air from the heater may be conducted through said conduit to the windshield, said bracket having formed at one end a pair of spaced parallel ears formed with suitable slots, a conduit provided with a clamping member adapted to be received in said slots thereby to secure the conduit to the bracket, and a threaded element mounted in the opposite end of said bracket for clampingly securing the bracket to the casing of the heater.

3. A bracket for securing one end of a flexible conduit to a heater casing, whereby a portion of the hot air from the heater may be conducted through said conduit to the windshield, said bracket having formed at one end a pair of spaced parallel ears to which one end of the conduit may be adjustably secured, a U-shaped portion at the opposite end of said bracket comprising a thin tongue adapted to be inserted between complemental parts of the heater casing, and threaded means for clampingly securing said tongue in position between said complemental casing parts.

4. A bracket for attaching one end of a flexible conduit to a heater, whereby a portion of the hot air of the heater may be received in said conduit and conducted thereby to a point remote from the heater, said bracket comprising a body portion having a pair of spaced parallel ears at one end disposed at substantially right angles to said body portion, each ear having an open ended slot, spaced members on the conduit engageable with said ears, a clamping device supported in said members and adapted to be received in said slots and whereby the conduit may be secured to said ears, the opposite end of said body having formed thereon a U-shaped portion comprising a thin tongue adapted to be inserted between over-lapping portions of the heater casing, and a clamping screw mounted in said body portion and cooperating with said tongue to clampingly secure the bracket to the heater casing.

5. A bracket for attaching one end of a flexible conduit to a heater, whereby a portion of the hot air of the heater may be received in said conduit and conducted to a point remote from the heater, said bracket comprising a body portion having means at one end for adjustably securing one end of the conduit thereto, the opposite end of said body being formed with a thin tongue offset from the medial plane thereof and adapted to be inserted between over-lapping portions of the heater casing substantially without distorting said portions and a clamping screw cooperating with said tongue to detachably secure the bracket to the heater casing.

6. In combination with an automobile heater having an outer casing and a discharge opening, a conduit for leading heated air from the heater, an intake nozzle placed to receive air from the discharge opening, said nozzle having ears, a bracket secured to the outer side of the casing, means by which the nozzle ears are swingingly attached to the bracket including a bolt passing through the ears and about which the ears can swing to adjust the nozzle relatively to the discharge opening, and means cooperative with the bolt by which clamping action is obtained to secure the nozzle in any adjusted position.

7. A device of the class described comprising, a nozzle having ears and a bolt passing therethrough, a bracket having a tongue which can be inserted between casing sections of an automobile heater and having a pair of ears having open end slots therein for receiving said bolt, and means by which the bolt clamps the ears of the nozzle against the slotted ears, whereby the bolt allows for swinging adjustment of the nozzle in relation to the discharge side of the heater, and whereby insertion of the bolt in the ears of the bracket is facilitated.

RINEHART SCHUMANN.